T. W. BROWN.
FLY TRAP.

No. 179,445. Patented July 4, 1876.

Witnesses.
S. N. Piper.
J. R. Snow.

Thomas W. Brown.
by his attorney
R. U. Eddy

UNITED STATES PATENT OFFICE.

THOMAS W. BROWN, OF BELMONT, MASSACHUSETTS.

IMPROVEMENT IN FLY-TRAPS.

Specification forming part of Letters Patent No. 179,445, dated July 4, 1876; application filed June 12, 1876.

*To all whom it may concern:*

Be it known that I, THOMAS W. BROWN, of Belmont, of the county of Middlesex and State of Massachusetts, have invented a new and useful Improvement in Fly-Traps; and I do hereby declare the same to be fully described in the following specification, and represented in the accompanying drawings, of which—

Figure 1:
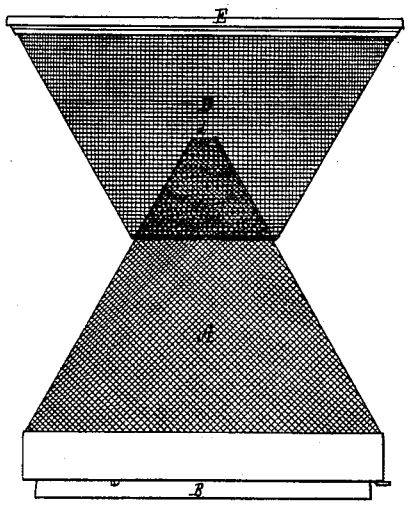
Figure 2:
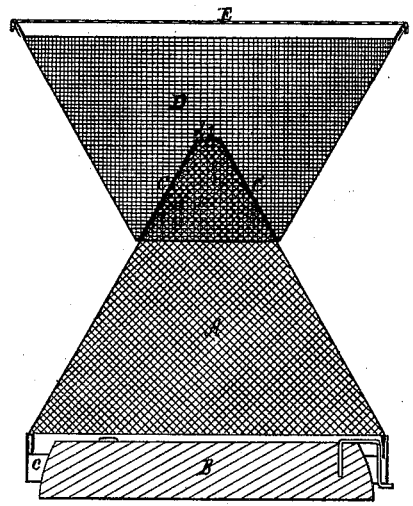

Figure 1 is a front elevation, and Fig. 2 a vertical section, of a trap embodying my invention.

This trap is constructed, mostly, of woven wire, its bait and fly receiving part, or case A, being conical, especially in its upper part, and provided with a bottom or base, B. It also is open at the apex, as shown at $b$. The base is to have one or more passages, $c$, for the entrance of the flies. The upper or entrapping part is composed of a short hollow cone, C, and an inverted hollow conic frustum, D, they being united at the larger base of the cone and the smaller base of the frustum. The said cone is open at the apex, as shown at $d$, and extends up within the frustum, and is to receive and rest on the upper portion of the conic case A. The frustum D is provided with a foraminous and removable cover, E, to its mouth. In constructing the cone and frustum it is customary to stamp, by means of suitable dies or molds, from a single circular disk of woven wire, the two, arranged and connected together, as described, the cone being to hold the trapping-frustum in place upon the bait-cone, and to admit of being readily removed therefrom and discharged of flies, while the bait-cone, in the mean time, is being used to allure and receive other flies. After the insects gathered in the entrapping-frustum have been killed, they may be discharged from it, after opening it at its base, and removing the covers from it. The cone C, within the entrapping-case D, will prevent the escape of the flies from the case after their entry therein. Instead of being conical in shape the parts A C D may be pyramidal.

I claim as my invention—

The improved fly-trap, consisting of the foraminous or woven-wire portion, or tapering case A, open at its apex, and the foraminous or woven-wire tapering parts C D arranged and applied essentially as set forth, the said portion D being provided with a foraminous cap or cover at its upper or larger end, as represented.

THOMAS W. BROWN.

Witnesses:
 R. H. EDDY,
 J. R. SNOW.